Figure 1:
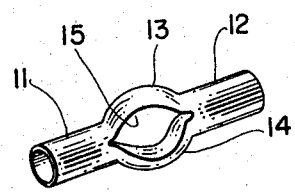

United States Patent Office 3,324,231
Patented June 6, 1967

3,324,231
ELECTRICAL CONNECTION OF METAL
SHEATHED CABLES
Howard B. Miller, 2702 Verell St.,
Hampton, Va. 23361
Filed Dec. 29, 1964, Ser. No. 422,101
4 Claims. (Cl. 174—88)

The invention described herein may be manufactured and used by or for the Government of the United States of America for governmental purposes without the payment of any royalties thereon or therefor.

The invention relates generally to an electrical connector and more specifically concerns an electrical connector for connecting metal sheathed thermocouple leads to flexible thermocouple leads.

Metal sheathed thermocouple leads consist of two wires tightly packed in a ceramic powder inside a metal tube. This thermocouple lead wire is expensive relative to flexible thermocouple lead wire. For the majority of installations a few inches of the expensive wire is sufficient. This is installed in the immediate area of extreme temperatures. As soon as the surrounding air temperature permits, the metal sheathed thermocouple lead is connected to the less expensive flexible lead to complete the circuit from the thermocouple to the recording or transmitting instrument.

In making these connections of a metal sheathed thermocouple lead to flexible thermocouple lead, there are many problems encountered; especially when the leads are only one-sixteenth of an inch or less in diameter. First, the ceramic powder inside the metal tube of the metal sheathed thermocouple lead absorbs moisture from the atmosphere. This moisture changes the reliability and accuracy of the thermocouple by changing the internal insulating qualities of the ceramic powder. Second, when the leads are connected together, there are other thermocouples added to the circuit if the wires in the different leads are made from different materials. However, this does not affect the reading of the main thermocouple if no draft blows over the connections. Third, the wire in the metal sheathed thermocouple lead is usually very brittle; therefore, when the electrical connections are subjected to vibrations, the thermocouple wire often breaks. And fourth, the wires at the connection can become shorted or grounded because of vibrations or foreign materials.

It is therefore, an object of this invention to provide an electrical connector for connecting metal sheathed thermocouple leads to flexible thermocouple leads.

Another object of this invention is to provide an electrical connection of a metal sheathed thermocouple lead to a flexible thermocouple lead in which the powder inside the metal sheath is kept free from atmospheric moisture.

A further object of this invention is to provide an electrical connection of a metal sheathed thermocouple lead to a flexible thermocouple lead in which the individual wire connections are kept free from drafts and foreign materials.

Still another object of this invention is to provide an electrical connection of a metal sheathed thermocouple lead to a flexible thermocouple lead in which the wires are protected from breaking, grounding and shorting.

A still further object of this invention is to provide an electrical connection of a metal sheathed thermocouple lead to a flexible thermocouple lead in which the connections of the thermocouple wires are visible for inspection during all stages of assembly and after assembly.

Figure 2A:
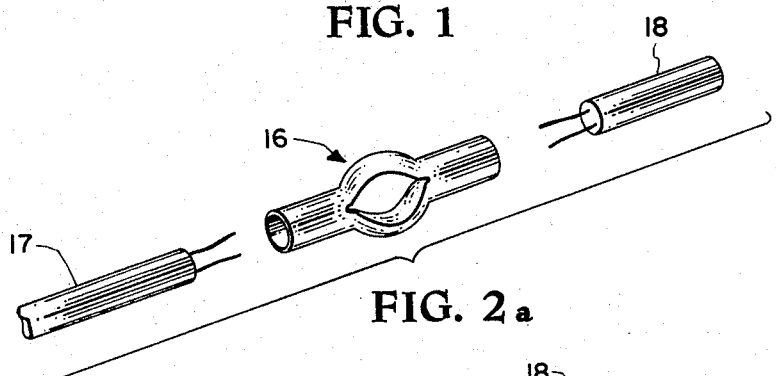
Figure 2B:
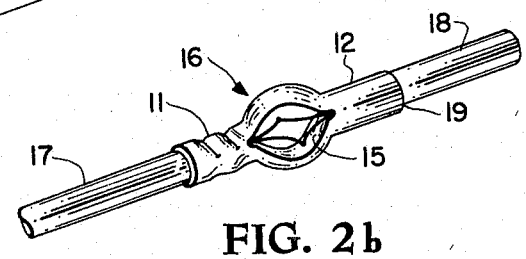
Figure 2C:
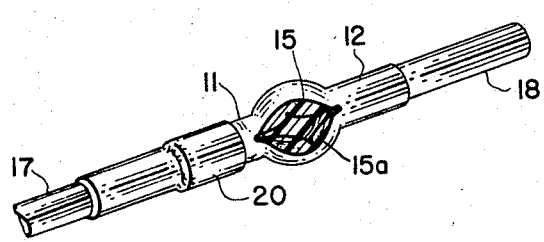

Other objects and advantages of this invention will further become apparent hereinafter and in the drawings, in which:

FIG. 1 is a perspective drawing of the electrical connector that constitutes this invention; and FIGS. 2a, 2b and 2c show the steps involved in making an electrical connection using the electrical connector shown in FIG. 1.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the preferred embodiment of the invention selected for illustration in the drawing, the numbers 11 and 12 in FIG. 1 designate metal tubular sections. The inside diameters of tubular sections 11 and 12 are made to fit the outside diameters of the thermocouple leads that are to be connected together. The tubular sections 11 and 12 are shown as having circular cross sections. However, they can have cross sections to accommodate any available thermocouple leads without departing from the spirit or scope of this invention. Tubular sections 11 and 12 are connected together by two straps 13 and 14. Straps 13 and 14 are curved outwardly from the center of tubular sections 11 and 12 to form an opening or window 15 between tubular sections 11 and 12. Opening 15 serves two purposes: it provides a space where the thermocouple wires can be connected and it provides a space into which a potting compound can be poured.

Referring to FIGS. 2a, 2b and 2c, it will now be explained how the connector in FIG. 1 is used to make a connection. In FIG. 2a the number 16 designates generally the connector shown in FIG. 1, and the numbers 17 and 18 designate the flexible thermocouple lead and the metal sheathed thermocouple lead, respectively, that are to be connected. In FIG. 2b the thermocouple lead 17 is inserted into tubular section 11 which is then crimped over the insulation of lead 17; and the thermocouple lead 18 is inserted into tubular section 12 and attached thereto at location 19 by any suitable means such as silver-brazing. The wires of leads 17 and 18 are then joined in the opening 15 and silver-brazed together through opening 15 after which the excess wire is clipped off. In FIG. 2c for further protection against abrasion and breakage, a small length of heat-shrinkable plastic tubing 20 is secured over one end of tubular section 11 and a portion of flexible lead 17; and a suitable transparent moisture-proof electrically insulating potting compound 15a is worked into opening 15 to capsulate the wire junctions. A suitable potting compound is a plastic resin potting compound which is commercially available.

The advantages of this invention are numerous. With the use of this invention, where temperature conditions permit, only a limited amount of expensive metal sheathed thermocouple leads need be used. Less costly flexible leads are used from the connectors to the recording instruments. An outstanding feature of this invention is that it makes provisions for visual inspection during all phases of assembly; thus overcoming objectionable features of other known methods of joining metal sheathed thermocouple leads to flexible thermocouple leads where the outside diameter of the metal sheathed thermocouple lead is one-sixteenth of an inch in diameter or less. This invention is useful for making connections that will be subject to severe vibration since the thermocouple wires are protected against breaking, shorting, and grounding by the potting compound in opening 15 and the plastic tubing 20. The ceramic powder inside lead 18 is kept moisture-free by the potting compound, and the potting compound makes the connection free from drafts.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. An electrical connection of a metal sheathed thermocouple lead to a flexible thermocouple lead comprising: a first tubular section fitted over said metal sheathed thermocouple lead and attached thereto; a second tubular section fitted over said flexible thermocouple lead and crimped thereon; means connecting said first and second tubular sections such that an opening is made between the two sections; appropriate connections of the wire in said thermocouple leads within said opening; and a moisture-proof electrically insulating potting compound in said opening encapsulating said appropriate connections and the end of said metal sheathed thermocouple lead.

2. An electrical connection in accordance with claim 1 wherein said means for connecting said first and second sections consists of two nontouching straps curved outwardly from the centers of said tubular sections.

3. An electrical connection in accordance with claim 1 wherein a small length of plastic tubing is secured over said second tubular section and a portion of said flexible thermocouple lead.

4. An electrical connection in accordance with claim 1 wherein said potting compound is transparent whereby visual inspection can be made during all phases of installation.

References Cited
UNITED STATES PATENTS

| | | |
|---|---|---|
| 1,951,654 | 3/1934 | Green. |
| 3,225,321 | 12/1965 | Walter _____ 174—76 X |

FOREIGN PATENTS

| | | |
|---|---|---|
| 1,147,778 | 7/1957 | France. |
| 310 | 1892 | Great Britain. |

LEWIS H. MYERS, *Primary Examiner.*

D. L. CLAY, *Assistant Examiner.*